(12) United States Patent
Zhang et al.

(10) Patent No.: US 10,583,402 B2
(45) Date of Patent: Mar. 10, 2020

(54) ANTIFOULING MEMBRANE FILTRATION SYSTEM

(71) Applicant: New Jersey Institute of Technology, Newark, NJ (US)

(72) Inventors: Wen Zhang, Livingston, NJ (US); Wanyi Fu, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 248 days.

(21) Appl. No.: 15/786,961

(22) Filed: Oct. 18, 2017

(65) Prior Publication Data

US 2018/0104653 A1    Apr. 19, 2018

Related U.S. Application Data

(60) Provisional application No. 62/409,431, filed on Oct. 18, 2016, provisional application No. 62/409,449, filed on Oct. 18, 2016.

(51) Int. Cl.
*B01D 61/12* (2006.01)
*B01D 65/02* (2006.01)
(Continued)

(52) U.S. Cl.
CPC .............. *B01D 65/08* (2013.01); *B01D 61/12* (2013.01); *B01D 65/02* (2013.01); *B01D 65/10* (2013.01);
(Continued)

(58) Field of Classification Search
None
See application file for complete search history.

(56) References Cited

U.S. PATENT DOCUMENTS

| 5,415,768 A | * | 5/1995 | Andelman | B01D 15/36 204/600 |
| 2003/0226840 A1 | * | 12/2003 | Dalton | B01D 53/32 219/634 |

(Continued)

OTHER PUBLICATIONS

Ajmani, et al., "Modification of low pressure membranes with carbon nanotube layers for fouling control", Water Research, vol. 46, Issue 17, Nov. 2012, pp. 5645-5654.
(Continued)

*Primary Examiner* — Bradley R Spies
(74) *Attorney, Agent, or Firm* — Lerner, David, Littenberg, Krumholz & Mentlik, LLP (57) ABSTRACT

A novel fluid filtration system that exhibits antifouling properties against a variety of potential foulants includes at least one filtration membrane placed in a cross-flow filtration module. The module is subjected to microwave irradiation at a certain power or intensity over a controlled time interval. At least one microwave generator produces microwaves and may be fixed or movable to treat the fluid. Dislodged foulants are removed by the microwave electromagnetic energy from the filtration membrane and carried away in a cross-flow stream and wasted or recycled back to a feed solution container. The filtration system may use different filtration configurations such as, but not limited to, flat sheet, hollow fiber, spiral wound and tubular membranes. The filtration membrane materials may be polymeric, ceramic, and combinations. The functionalized membranes can be such as, but not limited to, membranes coated or blended or cross-linked with materials displaying strong microwave absorption; and combinations.

20 Claims, 2 Drawing Sheets

(51) Int. Cl.
| | |
|---|---|
| B01D 65/08 | (2006.01) |
| B01D 71/02 | (2006.01) |
| C02F 1/00 | (2006.01) |
| C02F 1/30 | (2006.01) |
| B01D 65/10 | (2006.01) |
| C02F 1/20 | (2006.01) |
| C02F 1/44 | (2006.01) |
| B01D 67/00 | (2006.01) |

(52) U.S. Cl.
CPC ............ *C02F 1/001* (2013.01); *C02F 1/008* (2013.01); *C02F 1/20* (2013.01); *C02F 1/302* (2013.01); *C02F 1/44* (2013.01); *B01D 67/0088* (2013.01); *B01D 71/021* (2013.01); *B01D 71/022* (2013.01); *B01D 2311/2615* (2013.01); *B01D 2321/34* (2013.01); *C02F 2303/16* (2013.01); *C02F 2303/20* (2013.01)

(56) References Cited

U.S. PATENT DOCUMENTS

| | | | |
|---|---|---|---|
| 2004/0011723 A1* | 1/2004 | Bradford | B01D 61/10 210/321.74 |
| 2004/0226871 A1* | 11/2004 | Schob | B01D 35/18 210/184 |
| 2007/0295650 A1* | 12/2007 | Yoneda | B01D 61/025 210/97 |
| 2010/0051546 A1* | 3/2010 | Vuong | B01D 61/027 210/637 |
| 2016/0354729 A1* | 12/2016 | Krishna | B01D 69/148 |
| 2017/0136417 A1* | 5/2017 | Le | B01D 65/02 |

OTHER PUBLICATIONS

Avlonitis, et al., "Energy consumption and membrane replacement cost for seawater RO desalination plants", Desalination, vol. 157, Issues 1-3, Aug. 2003, pp. 151-158.

Buchelnikov et al., "Heating of metallic powders by microwaves: Experiment and theory", J. Appl. Phys., 104 (11), Dec. 2008, 113505.

Coleman, et al., "Small but strong: a review of the mechanical properties of carbon nanotube-polymer composites", Carbon, 44 (9), Aug. 2006, pp. 1624-1652.

Duan et al., "Polyaniline-Coated Carbon Nanotube Ultrafiltration Membranes: Enhanced Anodic Stability for In Situ Cleaning and Electro-Oxidation Processes", ACS Appl. Mater. Interfaces, 8(34), Aug. 2016, pp. 22574-22584.

Duan et al., "Treating anaerobic sequencing batch reactor effluent", Journal of Membrane Science, 504, Jan. 2016, pp. 104-112.

Enevoldsen, et al., "Electro-ultrafiltration of industrial enzyme solutions", J. Membr. Sci., 299 (1), Aug. 2007, pp. 28-37.

Gao et al., "Electrochemical Carbon Nanotube Filter Oxidative Performance as a Function of Surface Chemistry", Environ. Sci. Technol., 45 (22), Oct. 2011, pp. 9726-9734.

Guo, et al., "A mini-review on membrane fouling", Bioresour. Technol., vol. 122, Oct. 2012, pp. 27-34.

Kyllönen, et al., "Experimental aspects of ultrasonically enhanced cross-flow membrane filtration of industrial wastewater", Ultrasonics Sonochemistry, 13 (4), May 2006, pp. 295-302.

Masuda, et al., "Influence of microbubbles on free radical generation by ultrasound in aqueous solution: dependence of ultrasound frequency", The Journal of Physical Chemistry B, 119 (40), Sep. 2015, pp. 12887-12893.

Shi, et al., "Fouling and cleaning of ultrafiltration membranes: A review", Journal of Water Process Engineering, vol. 1, Apr. 2014, pp. 121-138.

Sornchamni, et al., "Magnetically Assisted Filtration for Solid Waste Separation and Concentration in Microgravity and Hypogravity", Industrial & Engineering Chemistry Research, 44 (24), Oct. 2005, pp. 9199-9207.

Van der Bruggen, et al., "A review of pressure-driven membrane processes in wastewater treatment and drinking water production", Environ. Prog., 22 (1), Apr. 2003, pp. 46-56.

Vecitis et al., "Elimelech, M. Electrochemical multiwalled carbon nanotube filter for viral and bacterial removal and inactivation", Environ. Sci. Technol., 45 (8), Mar. 2011, pp. 3672-3679.

Wang et al., "Microwave Absorption Properties of Carbon Nanotubes-Epoxy Composites in a Frequency Range of 2-20 GHz", Open Journal of Composite Materials, 3 (02), Apr. 2013, pp. 17-23.

Wang et al., "Microwave-Induced Interfacial Nanobubbles", Langmuir, May 2016.

Zhu et al., "Cleaning with Bulk Nanobubbles", Langmuir, Apr. 2016.

Zondervan et al., Evaluation of different cleaning agents used for cleaning ultra filtration membranes fouled by surface water, J. Membr. Sci., 304 (1-2), Nov. 2007, pp. 40-49.

\* cited by examiner

ANTIFOULING MEMBRANE FILTRATION SYSTEM

CROSS-REFERENCE TO RELATED APPLICATION

The present application claims the benefit of the filing date of U.S. Provisional Patent Application No. 62/409,431, filed Oct. 18, 2016, and Provisional Patent Application No. 62/409,449, also filed Oct. 18, 2016, the disclosures of which are hereby incorporated herein by reference.

FIELD OF USE

The present disclosure generally relates to a liquid filtration system. In particular, the present disclosure relates to a microwave-assisted antifouling membrane water filtration system that prevents or mitigates filter membrane fouling.

BACKGROUND

Typically liquid filtration and in particular water filtration is needed for the omission of pollutants and other unwanted materials. Membrane filtration systems are used to filter liquids and typically include a set of filtering elements made of porous membranes within a module or cell. The use of membranes is a well-known and effective separation process. Different membrane types, including nano-filtration (NF), ultra-filtration (UF), micro-filtration (MF) and reverse osmosis (RO), are used to remove suspended particles, colloids, microorganisms and even reject ions in solution[1].

In operation, pollutants in a fluid gradually form a cake layer on surfaces of the porous membrane and/or block the pores of the porous membrane[2]. To maintain satisfactory filtration performance, it is necessary to restore the membrane performance after a certain filtration time by replacement of the filter or cleaning of the filter membrane.

There are several methods to restore membrane performance. One method of restoration involves replacing all the membranes when an increasing amount of pressure, called head loss, has exceeded a specified value[3]. This method has certain disadvantages, such as the handling of a large volume of the impurities retained by the membranes and handling of these replaced membranes themselves. Additionally, membrane replacement leads to increased labor work and cost as well as increased time of suspension of the filtration system.

Another restoration process is backwashing, which consumes a certain quantity of clean water to pass in countercurrent through the filtering membranes. While the backwashing method avoids the demounting of the filter and the replacement of the membranes, backwashing is not ideal because a large volume of clean water is required for cleaning. This results in a large amount of contaminated wash water requiring proper disposal or treatment. Additionally, backwashing requires suspension of filtration operation and therefore interrupts the continuous filtration process.

Chemical cleaning is another restoration process, which involves the use of corrosive acid or base solution, oxidants, or detergents to clean fouled membranes[4]. Accordingly, membrane degradation may be a problem due to the harsh chemicals[5], and requires suspension of the continuous filtration process. For example, while some chemicals, such as oxidant and caustic soda, will chemically oxidize and remove surface foulants, these chemicals may damage the membrane integrity and shorten the lifetime of membranes, especially polymer membranes. Additionally, this process results in more chemical consumption and higher waste handling and disposal cost.

Another process to restore membranes involves the use of external field forces to aid filtration. For example, magnetically assisted filters[6], electrically assisted filters[7], and ultrasonically enhanced filtration[8] are proposed to mitigate membrane fouling. However, these methods suffer high-energy consumption, membrane erosion, and non-uniform energy distribution on the fouled membrane surface.

Accordingly, there is a pressing need in the membrane filtration industry to develop an anti-fouling filtration system without interrupting the filtration process and with a uniform distribution of energy to save operation costs.

Thus there still remains a need in the art for an antifouling system without the above drawbacks. Furthermore there also remains a need in the art for a filtration system that eliminates the need to replace the filter membrane and does not include the above drawbacks of restoring the membrane as seen in the current systems.

SUMMARY OF THE INVENTION

The present disclosure overcomes the problems of current state of the art filtration system and provides many more benefits. Shown and described is a novel filtration system that exhibits antifouling properties against a variety of potential foulants that include, but are not limited to, colloidal and/or particles, proteins, organic matters. The filtration system includes at least one filtration membrane placed in a cross-flow filtration module. The module is subjected to microwave irradiation of certain power or intensity over a controlled time interval. The filtration system further includes at least one microwave generator producing microwave to treat a fluid to be filtered. Depending on the embodiment, the microwave generator may be magnetron based. Dislodged foulants or pollutants removed by the microwave electromagnetic energy from the filtration membrane are carried away in a cross-flow stream and wasted or recycled back to the feed solution container. The microwave generator can be attached to membrane modules or switchable to irradiate different membrane module units or as a separate unit. The microwave generator can be fixed or movable around the membrane module. The filtration system can use different filtration membrane configurations such as, but not limited to, flat sheet, hollow fiber, spiral wound and tubular membranes. The filtration membrane materials can be, but not limited to, polymeric, ceramic and various combinations thereof.

The functionalized membranes may be such as, but not limited to, membranes synthesized through the deposition and cross-linking of carbon based materials such as but not limited to graphite, expanded graphite, graphene, carbon, carbon nanotubes, and the like and membranes coated with metal or metal oxide and the metal could be such as but not limited to Fe (iron), Bi (bismuth), Co (cobalt), Cu (copper), Ag (silver), Ni (nickel) and Al (aluminum) and the like microparticles or nanoparticles, and membranes with a graphite, metal or carbon nanotubes mat on the membrane surface, and any kinds of membranes coated or blended or cross-linked with materials displaying strong microwave absorption, and combinations thereof.

In accordance with the present disclosure, a filtration system is provided. Depending on the embodiment, the filtration system includes a filtration cell, an inlet conduit for liquid to be filtered in the cell, an outlet conduit for concentrated liquid, a permeate outlet conduit for filtered liquid, a porous filtration membrane located between the inlet and outlet conduits, and a microwave generator to irradiate the porous filtration membrane in an effective manner The filtration system mitigates membrane fouling and/or maintains non-fouling conditions during membrane filtration processes. Depending on the defouling and antifouling demand. The microwave generator may be operated either continuously or intermittently to maintain the filtration at a satisfactory condition. Microwave has significant advantages over traditional antifouling methods. For example, it is free of chemicals, and non-disrupting to filtration. Additionally, this method is applicable for both small- and large-scale systems with low maintenance.

Functionalized membranes are broadly manufactured through the incorporation or coating of carbon nanotubes (CNTs), graphene and/or metal and/or metal oxide particles on membranes to achieve antifouling effects and other desirable properties, for example, conductivity, selective adsorption, and antimicrobial activity among others. CNTs are featured by their extremely high surface area to volume ratios and good conductivity. CNTs also have the possibility of inducing redox reactions to destroy contaminants that adsorb onto CNT mats, augmenting sorption as a mechanism for contaminant removal[9]. In addition to contaminant removal, previous studies have shown that microporous CNT mats, when attached to flat sheet membranes enhance fouling resistance, triple the time for the transmembrane pressure (TMP) to increase with minimal reduction in the membrane's clean water permeability[10]. When exposed to an external electromagnetic field, the electrons in the microwave absorbing materials will generate an inductive current which then cause radiation attenuation and energy dissipation[11].

CNTs and CNT composites have been emerging as new perspective microwave absorbers[12]. Graphite also has a strong microwave absorption ability because of its low resistance, being able to transmit high thermal energy to the surface, resulting in a dramatic temperature increase on the surface[13]. The hot graphite substrate may provide possibilities for interfacial nano-bubble formation in an aqueous solution due to the air solubility reduction at local high temperatures. Similarly, it was reported that monolithic metals reflect microwaves. However, metal powder particles, for example particle size is less than 100 μm, may absorb microwaves and convert the microwave energy into heat or other chemical reactive species[14]. Accordingly, functionalized membranes may be good microwave absorbers and enhance the production of nano-bubbles for antifouling effects if used in the filtration system.

The present disclosure further discloses an anti-fouling filtration system that uses microwave electromagnetic energy that is non-disrupting to the filtration process and chemical free. Depending on the embodiment, porous filtration membranes are disclosed that are functionalized membranes, such as but not limited to, membranes synthesized through the deposition and cross-linking of carbon based materials, for example graphite, expanded graphite, graphene, carbon and carbon nanotubes and the like. Again, the membranes are coated with metal or metal oxide, and the metal elements for example including but not limited to, iron (Fe), bismuth (Bi), cobalt (Co), copper (Cu), silver (Ag), nickel (Ni), aluminum (Al) microparticles or nanoparticles; and membranes with a graphite, metal or carbon nanotubes mat on the membrane surface; and any kinds of membranes coated or blended or cross-linked with materials displaying strong microwave absorption; and combinations. Microwave irradiation is used to improve the performance of cross-flow membrane filtration for liquid/pollutants separation. The filtration system mitigates membrane fouling and/or maintains non-fouling conditions during membrane filtration processes. The microwave generator may be operated either continuously or intermittently to maintain the filtration process at a satisfactory condition.

Depending on the embodiment, a filtration circuit may be provided. The filtration circuit includes, but is not limited to, a feed solution source, a pump utilized to pump feed solution from its source into the filtration cell, and a membrane filtration system to receive the liquid to be filtered. The membrane filtration system includes a filtration cell with rods and nuts that support and seal the cell, an inlet conduit for the liquid to be filtered into the filtration system, an outlet conduit for removing liquid concentrate from the membrane filtration system, and a permeate outlet conduit for the filtered fluid. The membrane filtration system further includes a membrane cell having a functionalized membrane that filters the liquid to be filtered, and a microwave generator.

The microwave generator produces microwave irradiation to the filtration module. The microwave electromagnetic energy dissipated onto the membrane surface creates nanobubbles and/or microbubbles on the membrane surface[13]. Those bubbles are capable of removing foulants from the membrane surface due to random Brownian motion. Additionally, nano-bubbles formed on the membrane surface and the non-thermal effects by microwave energy may also reduce concentration polarization and prevent the deposition of pollutants that lead to fouling[15]. Moreover, the collapse of nano-bubbles forms a hot spot, which has an excessively high pressure and high temperature, that induces thermally decomposition of water molecules to form reactive hydroxyl radicals[16]. These radicals might degrade the organic foulants such as proteins and cell debris, and may lead to the membrane fouling.

Depending on the embodiment in the present disclosure, a microwave generator system is placed such that nanobubbles are produced and reach the fouled surface of the membrane. Depending on the characteristics of the filtration membrane and the liquid to be filtered, microwave may, depending on the implementation, uniformly pass through the filtration membrane, unlike other external fields such as ultrasonic waves that may, depending on the implementation, bounce back from physical objects. Therefore, the microwave generator may, depending on the implementation, be located in any oriented direction to match the various configurations of filtration membranes, such as flat sheet, hollow fiber, spiral wound, and tubular.

Furthermore, the present disclosure provides for a microwave cleaning process for fouled membranes in a filtration system. The filtration system includes a cell with rods and nuts to support and seal the cell, an inlet conduit for the liquid to be filtered into the filtration system, an outlet conduit for removing liquid concentrate from the membrane filtration system, and a permeate outlet conduit for the filtered fluid. The membrane filtration system further includes a membrane cell having a functionalized membrane and a microwave generator. The process comprises emitting microwave electromagnetic energy to the filtration cell so as to dislodge pollutants retained by the filtration membrane, and cross-flow stream carrying away the pollutants dislodged from the filtration membrane through the outlet conduit.

In addition, the membrane filtration system provides for filtering a liquid to be filtered. The membrane filtration system includes a cell having rods and nuts or flanges, which support and seal the cell, an inlet conduit for introducing the liquid to be filtered into the cell, an outlet conduit for removing liquid concentrate from the cell, a permeate outlet conduit for the filtered fluid from the cell, and a membrane cell having a filtration membrane, which filters the liquid to be filtered. The inlet and outlet conduits communicate with a first surface of the filtration membrane and the permeate outlet conduit communicates with a second surface of the filtration membrane. A microwave generator is provided to produce microwave energy in direct contact with the liquid to be filtered and the filtration membrane. Alternatively, the microwave generator may, depending on the implementation, produce microwave energy in indirect contact with the liquid to be filtered and the filtration membrane.

Furthermore, as stated the filtration system exhibits anti-fouling properties against a variety of potential foulants for example colloidal particles, proteins and/or organic matters). Again, the filtration system includes at least one filtration membrane placed in the cross-flow filtration module wherein the module is subjected to microwave irradiation of certain irradiation intensity over a controlled time interval, and at least one microwave generator producing microwave to treat the functionalized membranes. When the microwave irradiation dissipates on the functionalized membrane surface, foulants or pollutants are dislodged from the surface and carried away in a cross-flow stream and wasted or recycled back to the feed solution container. This enhanced antifouling and defouling features are ascribed to the ability of thermal effects and non-thermal effects by microwave electromagnetic energy reactions with the fluid to be filtered and the functionalized membranes. The microwave generator can be fixed or movable around the membrane module. The filtration system may use different filtration membrane configurations such as, but not limited to, flat sheet, hollow fiber, spiral wound and tubular membranes. The filtration membrane materials can be such as, but not limited to, polymeric, ceramic and combinations.

Any combination and/or permutation of the embodiments are envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed systems and methods, reference is made to the accompanying figures, wherein.

DETAILED DESCRIPTION

Figure 1:
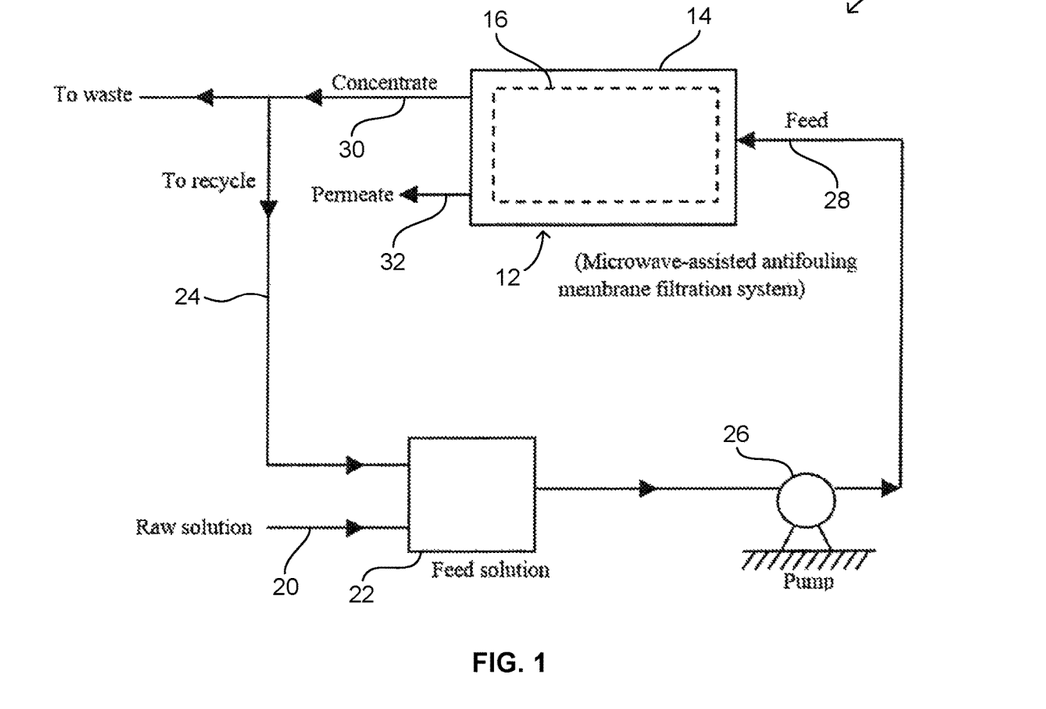
FIG. 1 is a schematic diagram of a microwave-assisted antifouling membrane filtration system incorporated into a filtration circuit in accordance with one embodiment of the present disclosure.
Figure 2:
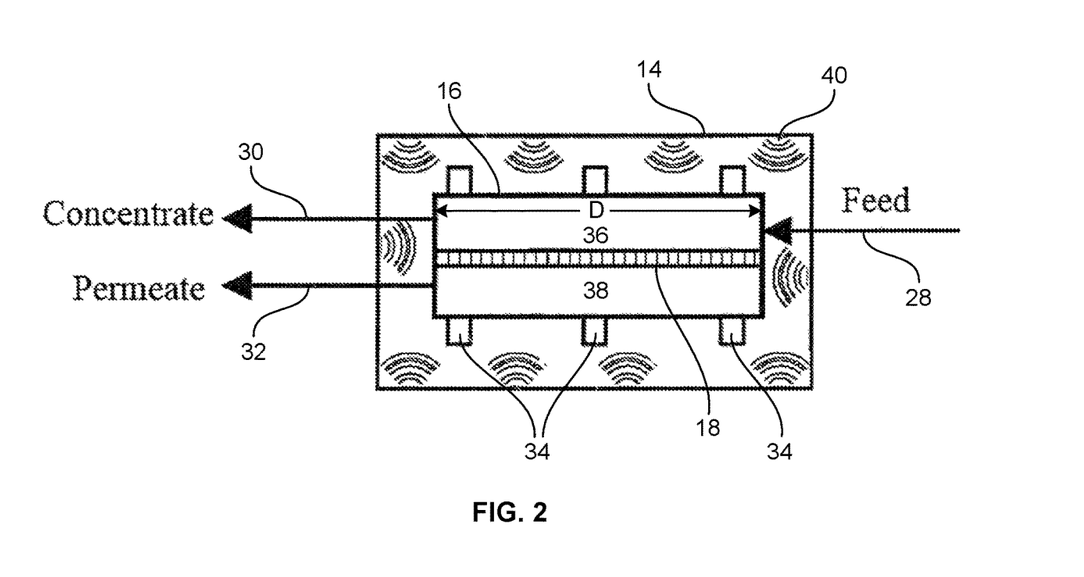
FIG. 2 is a cross-sectional view of a microwave-assisted antifouling membrane cell of the filtration system according to an embodiment of the present disclosure having a flat sheet filtration membrane and a microwave generator in direct contact with a fluid inside the membrane cell and the membrane surface.

In general, this disclosure overcomes the disadvantages of past attempts. Shown in FIG. 1 is a schematic diagram of a filtration circuit 10 that includes a microwave-assisted antifouling membrane filtration system 12 according to an embodiment of the present disclosure. The filtration system 12 includes one or multiple microwave generators 14 located around a filtration cell 16. The filtration cell 16 includes a functionalized membrane 18 (FIG. 2). Examples of different types of the filtration membrane 18 suitable for use with the present disclosure include, but not limited to, flat sheet, hollow fiber, spiral wound and tubular membranes. The filtration system 12 can use different membrane materials such as, but not limited to, polymeric, ceramic and combinations.

The filtration circuit 10 further includes a raw solution source 20 connected to a feed solution source 22. A recycle source 24 of concentrate exiting the membrane filtration system 12 and the raw solution source 20 may, depending on the implementation, be combined to provide the feed solution source 22. A pump 26 pumps the feed solution source 22 to provide the liquid to be filtered to the membrane filtration system 12.

The membrane filtration system 12, depending on the implementation comprises the filtration cell 16 and one or multiple microwave generators 14. The cell 16 further includes an inlet conduit 28 for the feed into the filtration system 12, and an outlet conduit 30 for removing liquid concentrate from the filtration system 12. The concentrate may, depending on the implementation, be recycled back to the feed solution source 22, or sent to waste. A permeate outlet conduit 32 is also provided for the filtered fluid, which permeates through the filtration membrane 12 enclosed within the cell 16.

FIG. 2 is a cross-sectional view of the microwave antifouling membrane cell 16 according to an embodiment of the present disclosure having a flat sheet functionalized membrane 18. The functionalized membrane 18 is provided within the filtration cell 16 having rods and nuts 34, which support and seal the cell 16. The functionalized membrane 18 comprises a porous material. Suitable porous materials include, but not limited to, ceramic, polymeric, metallic, and combinations thereof.

The functionalized membrane 18 can be, but not limited to, membranes synthesized through the deposition and cross-linking of carbon based materials such as but not limited to graphite, expanded graphite, graphene, carbon and carbon nanotubes, membranes coated with metal or metal oxide and the metal elements include such as Fe, Bi, Co, Cu, Ag, Ni and Al and the like microparticles or nanoparticles, and membranes with graphite, metal, metal oxide or carbon nanotubes mat on the membrane surface, and any type of membranes coated or blended or cross-linked with materials displaying strong microwave absorption, and combinations thereof.

Inlet and outlet conduits 28, 30 open out on both sides of the membrane filtration system 12, in the axial direction of the cell 16. The functionalized member 18 is provided within the filtration cell 16 and has a Diameter D, thereby dividing the cell 16 in cross-section into first and second portions 36 and 38, respectively. It will be understood that the diameter of the functionalized member 18 may, depending on the implementation, vary, and that the functionalized member 18 may, depending on the implementation, be any shape, such as circular, rectangular, etc. The fluid to be cleaned therefore passes through the functionalized membrane 18 from the first portion 36 to the second portion 38 before reaching the permeate outlet conduit 32. The arrangement of the inlet and outlet conduits 28 and 30, and the functionalized membrane 18 and the permeate outlet conduit 32 provides a cross-flow filtration system 12.

The membrane filtration system 12 further comprises one or more microwave generators 14 emitting microwave electromagnetic energy 40. In one embodiment, the generator 14 surrounds the filtration cell 16. The microwave generators 14 are preferably magnetron based and when in service to clean or mitigate the fouling of the functionalized membrane 18, emit microwave electromagnetic energy 40 of a frequency and power chosen to ensure in an effective manner Based on the properties of the feed solution, the microwave may, depending on the implementation, be operated continuously or intermittently. In one exemplary embodiment, the microwave generator 14 is operated at a frequency of 2.54 GHz, with power intensities of 1-20 $W/cm^2$ to clean a fouled polymeric filtration membrane coated with carbon nanotubes. As illustrated in FIG. 2, the microwave generator 14 provides an area source of microwave energy 40 rather than a point source.

Figure 3:
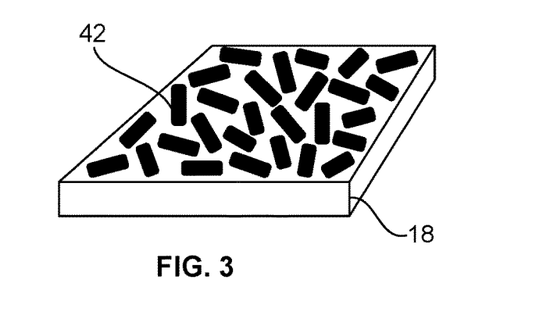
FIG. 3 is a schematic view of a functionalized membrane synthesized through the deposition or coating of carbon based materials (e.g., graphite, expanded graphite, graphene, carbon and carbon nanotubes)

FIG. 3 shows a schematic diagram illustrating a functionalized membrane 18 synthesized through the deposition or coating of carbon-based materials such as but not limited to graphite, expanded graphite, graphene, carbon and carbon nanotubes and the like. The rod like structures 42, which can be seen on the surface of the membrane 18, symbolize the nanotubes 42 deposited or coated on the membrane 18.

Figure 4:
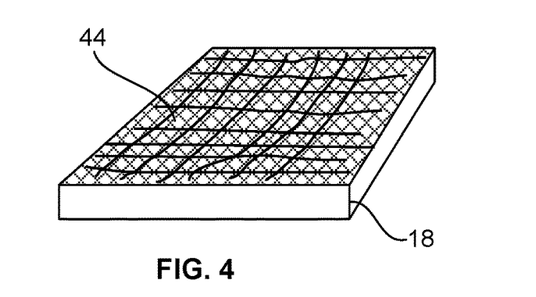
FIG. 4 is a schematic view of a functionalized membrane with a graphite, metal, metal oxide or carbon nanotubes mat on the membrane surface.

FIG. 4 shows a schematic diagram illustrating a functionalized membrane 18 with, for example, graphite, metal, metal oxide or carbon nanotubes mat on the membrane surface. The screen like structures 44, which can be seen on the surface of the membrane 18, symbolize the graphite, metal or carbon nanotubes mat 44 on the membrane 18.

Figure 5:
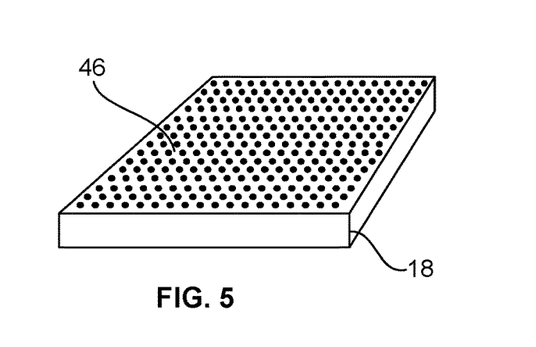
FIG. 5 is a schematic view of a functionalized membrane synthesized through the deposition or coated with metal or metal oxide (e.g., Cu, Ag, Ni, Al, $Fe_2O_3$, and $BiFeO_3$) microparticles or nanoparticles.

FIG. 5 shows a schematic diagram illustrating a functionalized membrane 18 synthesized through the deposition or coated with metal or metal oxide, for example, Cu, Ag, Ni, Al, $Fe_2O_3$, and $BiFeO_3$ and the like microparticles or nanoparticles. The dot-like structures 46, which can be seen on the surface of the membrane 18, symbolize the metal or metal oxide and the metal elements include such as but not limited to Fe, Bi, Co, Cu, Ag, Ni and Al and the like microparticles or nanoparticles 46 on the membrane 18.

Figure 6:
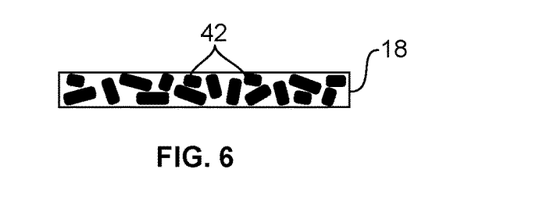
FIG. 6 is a cross-sectional view of a functionalized membrane cross-linking or blended with carbon based materials (e.g., graphene, graphite, expanded graphite, carbon and carbon nanotubes)

FIG. 6 shows a schematic diagram illustrating a functionalized membrane 18 cross-linking or blended with carbon-based materials (e.g., graphite, expanded graphite, graphene, carbon and carbon nanotubes). The rod-like structures 42, which can be seen within the membrane 18, symbolize the nanotubes 42 cross-linked or dispersed in the membrane 18.

Figure 7:
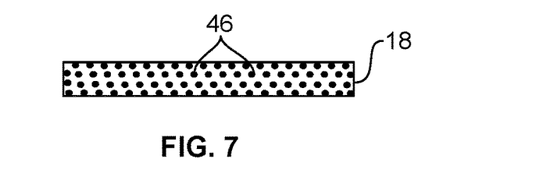
FIG. 7 is a cross-sectional view of a functionalized membrane cross-linking or blended with metal or metal oxide and the metal elements include such as copper, silver, nickel and aluminum microparticles or nanoparticles.

FIG. 7 shows a schematic diagram illustrating a functionalized membrane 18 cross-linking or blended with metal or metal oxide and the metal elements include for example, but not limited to, Fe, Bi, Co, Cu, Ag, Ni and Al and the like microparticles or nanoparticles. The dot-like structures 46, which can be seen within the membrane 18, symbolize the metal or metal oxide and the metal elements including but not limited to, Fe, Bi, Co, Cu, Ag, Ni and Al and the like microparticles or nanoparticles 46 cross-linked or dispersed in the membrane 18.

The pressure gauges or flux meters may, depending on the implementation, may be used with any of the membrane cell embodiments to monitor the degree of fouling and to automatically control the cleaning process when fouling reaches a preset level, for example, a drop of permeate flux by 20%. A cooling part may, depending on the implementation, be used with any of the membrane cell embodiments to cool the feed solution source 22, particularly when circulating the feed solution through the membrane filtration system.

The circuit 10 may, depending on the implementation, may include other subsystems and components to measure and control process variables, such as the degree of fouling, as required for effective performance. The circuit 10 may, depending on the implementation, may employ sensors or other condition detection and control subsystems or components that might be required to process at a particular rate or at a particular scale.

The circuit 10, depending on the implementation, may include a controller in communication with a sensor, the pressure gauge, or flux meters. The controller may, depending on the implementation, receive at least one process parameter, process the at least one process parameter, and adjust operation of the system based upon processing of the at least one process parameter.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

REFERENCES (1) Van der Bruggen, B.; Vandecasteele, C.; Van Gestel, T.; Doyen, W.; Leysen, R. A review of pressure-driven membrane processes in wastewater treatment and drinking water production. *Environ. Prog.* 2003, 22 (1), 46-56.

(2) Guo, W.; Ngo, H.-H.; Li, J. A mini-review on membrane fouling. *Bioresour. Technol.* 2012, 122, 27-34.

(3) Avlonitis, S.; Kouroumbas, K.; Vlachakis, N. Energy consumption and membrane replacement cost for seawater RO desalination plants. *Desalination* 2003, 157 (1), 151-158.

(4) Shi, X.; Tal, G.; Hankins, N. P.; Gitis, V. Fouling and cleaning of ultrafiltration membranes: A review. *Journal of Water Process Engineering* 2014, 1, 121-138.

(5) Zondervan, E.; Roffel, B. Evaluation of different cleaning agents used for cleaning ultra filtration membranes fouled by surface water. *J. Membr. Sci.* 2007, 304 (1-2), 40-49.

(6) Sornchamni, T.; Atwater, J. E.; Akse, J. R.; Wheeler, R. R.; Jovanovic, G. N. Magnetically Assisted Filtration for Solid Waste Separation and Concentration in Microgravity and Hypogravity. *Industrial & Engineering Chemistry Research* 2005, 44 (24), 9199-9207.

(7) Enevoldsen, A. D.; Hansen, E. B.; Jonsson, G. Electro-ultrafiltration of industrial enzyme solutions. *J. Membr. Sci.* 2007, 299 (1), 28-37.
(8) Kyllönen, H.; Pirkonen, P.; Nyström, M.; Nuortila-Jokinen, J.; Grönroos, A. Experimental aspects of ultrasonically enhanced cross-flow membrane filtration of industrial wastewater. *Ultrason. Sonochem.* 2006, 13 (4), 295-302.
(9) Vecitis, C. D.; Schnoor, M. H.; Rahaman, M. S.; Schiffman, J. D.; Elimelech, M. Electrochemical multiwalled carbon nanotube filter for viral and bacterial removal and inactivation. *Environ. Sci. Technol.* 2011, 45 (8), 3672-3679.
(10) Ajmani, G. S.; Goodwin, D.; Marsh, K.; Fairbrother, D. H.; Schwab, K. J.; Jacangelo, J. G.; Huang, H. Modification of low pressure membranes with carbon nanotube layers for fouling control. *Water Res.* 2012, 46 (17), 5645-5654.
(11) Coleman, J. N.; Khan, U.; Blau, W. J.; Gun'ko, Y. K. Small but strong: a review of the mechanical properties of carbon nanotube-polymer composites. *Carbon* 2006, 44 (9), 1624-1652.
(12) Wang, Z.; Zhao, G.-L. Microwave Absorption Properties of Carbon Nanotubes-Epoxy Composites in a Frequency Range of 2-20 GHz. *Open Journal of Composite Materials* 2013, 3 (02), 17.
(13) Wang, L.; Miao, X.; Pan, G. Microwave-Induced Interfacial Nanobubbles. *Langmuir* 2016.
(14) Buchelnikov, V.; Louzguine-Luzgin, D.; Xie, G.; Li, S.; Yoshikawa, N.; Sato, M.; Anzulevich, A.; Bychkov, I.; Inoue, A. Heating of metallic powders by microwaves: Experiment and theory. *J. Appl. Phys.* 2008, 104 (11), 113505.
(15) Zhu, J.; An, H.; Alheshibri, M.; Liu, L.; Terpstra, P. M. J.; Liu, G.; Craig, V. S. J. Cleaning with Bulk Nanobubbles. *Langmuir* 2016.
(16) Masuda, N.; Maruyama, A.; Eguchi, T.; Hirakawa, T.; Murakami, Y. Influence of microbubbles on free radical generation by ultrasound in aqueous solution: dependence of ultrasound frequency. *The Journal of Physical Chemistry B* 2015, 119 (40), 12887-12893.

What is claimed is:

1. A membrane filtration system having antifouling properties, comprising:
   at least one functionalized filtration membrane having a plurality of carbon nanotubes and disposed in a cross-flow filtration module or filtration cell for filtering a liquid, the functionalized filtration membrane surrounded by the liquid;
   a plurality of microwave generators located outside the cross-flow filtration module or filtration cell that produces an area source of a microwave energy rather than a point source, the generators either fixed or movable around the filtration membrane for producing the microwave energy to treat the liquid, the microwave energy in direct or indirect contact with the liquid and the filtration membrane;
   a controller in communication with a sensor, a pressure gauge or a flux meter to monitor degree of fouling on the functionalized filtration membrane and automatically control a cleaning process when fouling reaches a preset level;
   the microwave generator emitting the microwave energy during the cleaning process forming a continuous or an intermittent microwave irradiation of a certain power or intensity over a controlled time interval;
   an interfacial nano-bubble formation in the liquid onto a functionalized membrane surface of the functionalized membrane, the nano-bubble formation providing an antifouling effect and a non-thermal effect caused by the microwave energy;
   the antifouling effect having a plurality of nano-bubbles that remove foulants from the membrane surface due to random Brownian motion;
   the non-thermal effect having a collapse of the nano-bubbles that forms a hot spot that induces decomposition of the liquid to form reactive hydroxyl radicals that degrade foulants;
   a cooling part to cool a feed solution source that supplies the liquid when circulating the feed solution through the membrane filtration system; and
   a cross-flow stream in the cross-flow filtration module where foulants or pollutants are removed by the microwave energy from the filtration membrane and carried away in the cross-flow stream or recycled back into the feed solution source.

2. The membrane filtration system of claim 1, wherein the cross-flow filtration module further comprises:
   an inlet conduit for introducing the liquid into the filtration membrane;
   an outlet conduit for removing a liquid concentrate from the filtration membrane, and the inlet and outlet conduits open on both sides of the membrane filtration system in an axial direction;
   a permeate outlet conduit for removing a filtered fluid from the filtration membrane;
   wherein, the inlet conduit and the outlet conduit are in communication with a first surface of the filtration membrane and the permeate outlet conduit is in communication with a second surface of the filtration membrane, and the microwave generator producing the microwave energy is in contact with the liquid and the filtration membrane.

3. The membrane filtration system of claim 1, wherein the microwave generator is a magnetron based microwave generator.

4. The membrane filtration system of claim 1, wherein the filtration membrane is selected from a group consisting of a ceramic, a polymeric, a metallic, and any combinations thereof.

5. The membrane filtration system of claim 1, wherein the filtration membrane has a geometric configuration selected from a group consisting of a flat sheet, a hollow fiber, a spiral wound, a tubular membrane, and any combinations thereof.

6. The membrane filtration system of claim 1, wherein the filtration membrane is a porous filtration membrane and synthesized through deposition and cross-linking of carbon based materials.

7. The membrane filtration system of claim 6, wherein the carbon based materials are selected from a group consisting of a graphite, an expanded graphite, a graphene, a carbon nanotubes (CNTs), and any combination thereof.

8. The membrane filtration system of claim 6, wherein the filtration membrane is coated with a metal, an alloy, or a metal oxide microparticle or nanoparticle to form a functionalized membrane, wherein the metal, the alloy, or the metal oxide is based on at least one chemical element from a group that includes iron (Fe), bismuth (Bi), cobalt (Co), copper (Cu), silver (Ag), nickel (Ni), aluminum (Al), and any combinations thereof.

9. The membrane filtration system of claim 1, wherein the filtration membrane is coated or blended or cross-linked with a material displaying strong microwave absorption.

10. The membrane filtration system of claim 1, wherein the filtration membrane incorporates or is coated with a substance selected from the group consisting of carbon nanotubes (CNTs), graphene, metal particles, and any combination thereof for achieving at least antifouling effects, conductivity, selective adsorption, and antimicrobial activity.

11. A membrane filtration circuit having antifouling properties, comprising:
  a feed solution source;
  a pump connected to the feed solution source to provide a liquid for filtering;
  a filtration cell having a functionalized filtration membrane, the filtration cell to receive the liquid, and wherein the filtration cell further includes a plurality of rods and nuts that support and seal the filtration cell, an inlet conduit for the liquid to enter into the filtration cell, an outlet conduit for removing a liquid concentrate, and a permeate outlet conduit for transporting a filtered liquid, wherein the inlet and outlet conduits communicate with a first surface of the filtration membrane,
  at least one microwave generator to produce microwave energy, the microwave generator is in either direct or indirect contact with the liquid and the filtration membrane, and the microwave generator is either fixed or moveable around the filtration membrane
  a controller in communication with a sensor, a pressure gauge or a flux meter to monitor degree of fouling on the functionalized filtration membrane and automatically control a cleaning process when fouling reaches a preset level;
  the microwave generator emitting the microwave energy during the cleaning process forming a continuous or an intermittent microwave irradiation of a certain power or intensity over a controlled time interval;
  an interfacial nano-bubble formation in the liquid onto a functionalized membrane surface of the functionalized membrane, the nano-bubble formation providing an antifouling effect and a non-thermal effect caused by the microwave energy;
  the antifouling effect having a plurality of nano-bubbles that remove foulants from the membrane surface due to random Brownian motion;
  the non-thermal effect having a collapse of the nano-bubbles that forms a hot spot that induces decomposition of the liquid to form reactive hydroxyl radicals that degrade foulants;
  a cooling part to cool the feed solution source that supplies the liquid when circulating the feed solution through the membrane filtration circuit; and
  a cross-flow stream in the cross-flow filtration module where foulants or pollutants are removed by the microwave energy from the filtration membrane and carried away in the cross-flow stream or recycled back into the feed solution source.

12. The membrane filtration circuit of claim 11, further including a raw solution source connected to the feed solution source, wherein the liquid concentrate is recycled back to the feed solution source, or sent to a waste receptacle.

13. The membrane filtration circuit of claim 11, wherein the filtration membrane is surrounded by the microwave generator and the filtration membrane cell is either fixed or movable in any oriented direction to match various configurations of the filtration membrane.

14. The membrane filtration circuit of claim 13, wherein the microwave generator is positioned to produce nano-bubbles in the liquid to reach a fouled surface of the filtration membrane.

15. The membrane filtration circuit of claim 11, wherein the microwave generator is operated either continuously or intermittently to maintain filtration at a satisfactory condition, and free of chemicals and non-disrupting to filtration.

16. A process for microwave cleaning of a membrane filtration system, comprises:
  using a filtration cell having a porous filtration membrane for filtering a liquid, a plurality of rods and nuts or flanges to support and seal the filtration cell, an inlet conduit for the liquid to enter into the filtration cell, an outlet conduit for removing a liquid concentrate from the filtration cell, a permeate outlet conduit for transporting a filtered fluid, and a microwave generator;
  emitting microwave electromagnetic energy by the microwave generator in direct contact with the liquid and the porous filtration membrane in such a manner as to liberate a pollutant retained by the porous filtration membrane;
  monitoring degree of fouling on the functionalized filtration membrane by a controller in communication with a sensor, a pressure gauge or a flux meter;
  automatically controlling with the controller a cleaning process when fouling reaches a preset level;
  emitting the microwave energy by the microwave generator during the cleaning process and forming a continuous or an intermittent microwave irradiation of a certain power or intensity over a controlled time interval;
  forming an interfacial nano-bubble in the liquid onto a functionalized membrane surface of the functionalized membrane, the nano-bubble formation providing an antifouling effect and a non-thermal effect caused by the microwave energy;
  removing foulants from the membrane surface by a plurality of nano-bubbles;
  forming a hot spot that induces decomposition of the liquid to form reactive hydroxyl radicals that degrade foulants by the non-thermal effect with collapse of the nano-bubbles;
  cooling by a cooling part the feed solution source that supplies the liquid when circulating the feed solution through the membrane filtration circuit; and
  removing foulants or pollutants by a cross-flow stream in the cross-flow filtration module by the microwave energy from the filtration membrane; and
  carrying the foulant or pollutant liberated from the porous filtration membrane by the cross-flow stream through the outlet conduit or recycling back into the seed solution source.

17. The process for microwave cleaning of a membrane filtration system of claim 16, wherein the emitting microwave electromagnetic energy is of a certain frequency of about 2.45 GHz) and power from about (0-1000 Watt) chosen to ensure an effective manner of cleaning the porous filtration membrane.

18. The process for microwave cleaning of a membrane filtration system of claim 16, wherein the microwave generator is operated continuously or intermittently.

19. The process for microwave cleaning of a membrane filtration system of claim 16, further includes orienting a direction of the microwave electromagnetic energy to match various geometric configurations of the porous filtration membrane that is selected from a group consisting of a flat sheet, a hollow fiber, a spiral wound, a tubular membrane, and any combinations thereof.

20. The process for microwave cleaning of a membrane filtration system of claim 16, further includes recycling the liquid concentrate back into a feed solution source, or sending the liquid concentrate to a waste receptacle.

* * * * *